US005641582A

United States Patent [19]

Nire et al.

[11] Patent Number: 5,641,582

[45] Date of Patent: Jun. 24, 1997

[54] THIN-FILM EL ELEMENT

[75] Inventors: Takashi Nire, Hiratsuka; Atsushi Miyakoshi, Himeji, both of Japan

[73] Assignee: Komatsu Ltd., Tokyo, Japan

[21] Appl. No.: 325,195

[22] PCT Filed: Jul. 29, 1992

[86] PCT No.: PCT/JP92/00958

§ 371 Date: Oct. 28, 1994

§ 102(e) Date: Oct. 28, 1994

[87] PCT Pub. No.: WO93/21744

PCT Pub. Date: Oct. 28, 1993

[30] Foreign Application Priority Data

Apr. 16, 1992 [JP] Japan .................................... 4-121137

[51] Int. Cl.$^6$ .................................... B32B 9/00

[52] U.S. Cl. .................... 428/690; 428/697; 428/698; 428/699; 428/917; 313/502; 313/503; 313/509; 257/79; 257/98; 257/102

[58] Field of Search .................... 428/688, 690, 428/697, 698, 699, 917; 313/502, 503, 509; 257/79, 98, 102

[56] References Cited

U.S. PATENT DOCUMENTS

| | | | |
|---|---|---|---|
| 4,727,003 | 2/1988 | Ohseto et al. | 428/690 |
| 4,757,232 | 7/1988 | Berkstresser et al. | 313/468 |
| 4,800,173 | 1/1989 | Kanai et al. | 37/81 |
| 4,983,469 | 1/1991 | Huzino et al. | 428/690 |
| 5,087,531 | 2/1992 | Terada et al. | 428/690 |
| 5,237,182 | 8/1993 | Kitagawa et al. | 257/15 |
| 5,403,673 | 4/1995 | Haga et al. | 428/688 |

FOREIGN PATENT DOCUMENTS

| | | |
|---|---|---|
| 56-107289 | 8/1981 | Japan . |
| 57-119494 | 7/1982 | Japan . |
| 60-211798 | 10/1985 | Japan . |
| 62-74986 | 4/1987 | Japan . |
| 2-90493 | 3/1990 | Japan . |

OTHER PUBLICATIONS

S. Tanda, A. Miyakoshi and T. Nire, *Conference Record of the 1988 International Display Research Conference*, p. 122.

S. Tanaka et al, *Japanese Journal of Applied Physics*, vol. 25, No. 3, pp. L225–L227, 1986.

Ryozo Fukao et al, *Electronic Information Communication Society Technical Study Report*, vol. 86, No. 368, p. 5, 1987.

S. Tanaka et al, *Digest 1988 SID Int. Symp.*, pp. 293–296, 1988.

H. Sasakura et al, *J. Appl. Phys.*, 52 (11), 6901, 1981.

*Primary Examiner*—Patrick Ryan
*Assistant Examiner*—Marie R. Yamnitzky
*Attorney, Agent, or Firm*—Sidley & Austin

[57] ABSTRACT

A thin-film EL element which does not permit the color of the emitted light to change irrespective of a change in the voltage, which remains chemically stable and which emits light of high brightness even on a low voltage. The element comprises two or more polycrystalline thin light emitting layers (4, 5, 6) and one or more thin insulating layers (3, 7). The interface between a thin film and a thin film constituting a light emitting layer is formed by epitaxial growth, and the electrical characteristics of the element are equivalent to those of a single circuit which includes two Zener diodes (12, 13) connected in series, a capacitor (14) connected in parallel with the serially connected Zener diodes, and a capacitor (15) connected to one end of the capacitor (14).

20 Claims, 7 Drawing Sheets

THIN-FILM EL ELEMENT

TECHNICAL FIELD

The invention relates to a thin-film EL element in which light emitting layers are respectively constituted by thin films.

BACKGROUND ART

Up to this time, various approaches to obtain a newly different color of the emitted light have been made by forming a thin-film EL element in which two or more light emitting layers, each having a different color of emitted light, are laminated together to change the color of the emitted light by the laminated layers.

For example, "Ryozo FUKAO et. al.: Electronic Information Communication Society Technical Study Report, Vol. 86, No. 368, p. 5, 1987" describes such a thin-film EL element as a "two-terminals type tunable color EL", and as a laminate of a green color light emitting layer formed of ZnS:TbF3 and a red color light emitting layer formed of ZnS:SnF3. It is reported herein that, when applying a voltage to such a element, the color of emitted light is changed from red to yellow-green by an increase in the voltage, as shown in FIG. 11.

Also, "S. TANAKA et. al.: Digest 1988 SID Int. Symp., P. 293, 1988" describes another thin-film EL element in which a light emitting layer formed of SrS:Ce,K emitting light of blue-green color and a light emitting layer formed of SrS:Eu emitting light of red color are laminated together. It is also reported therein that a change in the voltage causes the color of the emitted light to change.

However, when making a panel for dot matrix display by using such laminated type of thin-film EL elements mentioned above, the effective voltage applied to the light emitting layer depends on the position in accordance with thickness distributions of the light emitting layer and the insulating layer, so that the color of the emitted light can vary with the location. Also, a voltage drop by line resistance of the electrode causes the color of emitted light to change between the bottom and the tip of the electrode. For these reasons, a problem called "nonuniformity of color" has arisen, so that making a useful panel could not be achieved.

It is considered that the above-mentioned problems are caused by the formation of a high resistant layer where crystallinity is low, also called a "dead layer", between the light emitting layer and the insulating layer with the thickness being from approximately 1000 to approximately 2000 Å. The "dead layer" generally occurs in a light emitting layer formed by conventional light emitting layer forming technique, such as EB (Electron Beam) evaporation method or sputtering method (e.g., see "H. SASAKURA et. al.: J. Appl. Phys. 52 (11), 6901, 1981").

When applying a voltage to a thin-film EL element which includes the conventional laminated type of light emitting layers mentioned above, each respective layer functions as independent thin-film EL elements. Such independent EL elements have "luminance—voltage" characteristics which are different from each other, thus causing the color of the emitted light to change in accordance with a change in the voltage.

For example, when the laminated light emitting strata has two layers, as shown in FIG. 12, it has a structure equivalent to that of a double circuit which includes two pairs of Zener diodes a and b, each pair being connected opposite to each other in series; two capacitors c connected in series, each being connected in parallel with the serially connected Zener diodes; and a capacitor d connected to one end of the two capacitors c.

On the other hand, up to the present, there have been various methods for obtaining full color display with a thin-film EL element. Of these, there are two typical types; one type uses a planar pattern formed of three kinds of materials each of which emits light of a respective one of the three primary colors, red (R), green (G) and blue (B) as shown in FIG. 13; the other type laminates such luminescent materials and decomposes the resulting mixed color emitted light by passing it through filters as shown in FIG. 14.

In FIG. 13, there are provided a glass substrate e, transparent electrodes d patterned on the glass substrate e, first and second insulating layers f and g, a segmented light emitting layer h in which each segment emits light of a respective one of the three primary colors and which are patterned between the insulating layers f and g, and a back plate i.

In FIG. 14, the same references as those of FIG. 13 indicate similar elements except a color filter k, and the light emitting layer h in FIG. 14 is formed by laminating three light emitting layers, each emitting a respective one of the three primary colors R, G and B.

However, the former, which is a patterned light emitting layer type, capable of full color display with the conventional thin-film EL element, has had such problems as the forming process being complicated, the light emitting layer being damaged during patterning, and the like.

Although the forming process is simple for the latter, which is a laminated light emitting layer type, the respective materials have different L—V characteristics. Further, the intensity of the electric field effectively applied to the intermediate light emitting layer is lower than that of each adjacent light emitting layer, so that other problems have arisen such that it was difficult to separate beams of light from the respective layers under a well-balanced condition.

In another method which has also been considered, white light, having a wide spectrum obtained from a single light emitting layer, such as SrS:Ce,Eu or the like, is separated by a color filter. However, efficient brightness can not be obtained from the light emitting layer formed of SrS:Ce,Eu and chemical stability of the base material SrS is worse.

SUMMARY OF THE INVENTION

In consideration of the above-mentioned problems, an object of the present invention is to provide a thin-film EL element in which two or more light emitting layers having differing colors of emitted light, are laminated together to emit light of a newly different color such that the thin-film EL element emits light of high brightness, remains chemically stable, and does not permit the color of the emitted light to change irrespective of a change in the voltage.

Further, another object of the present invention is to provide a thin-film EL element in which a thin-film emitting light and a thin-film not emitting light are laminated together so that the thin-film EL element emits light of high brightness even on a low voltage and remains chemically stable.

According to the present invention, a thin-film EL element, which includes two or more thin light emitting layers and one or more thin insulating layers, has electrical characteristics equivalent to those of a circuit which includes two Zener diodes connected in series opposite to each other, a first capacitor connected in parallel with the series circuit of Zener diodes, and another capacitor connected to one end of the first capacitor. The interface between one thin film and another thin film which constitutes a light emitting layer is formed by epitaxial growth.

Further, the light emitting strata constituting the thin-film EL element can be formed by use of methods, such as MSD (Multi-Source Deposition) method or CVD (Chemical Vapor Deposition) method, in which chemical elements constituting a compound or compounds including the chemical elements, are respectively supplied onto a substrate as source materials during formation of a compound thin film and chemically bonded on the substrate to form a desired compound thin film.

A ZnS:Mn film, which introduces Mn as an impurity for luminescence center into a base material ZnS, and a $Ba_xSr_{(1-x)}S$:Ce film which introduces Ce as an impurity for luminescence center into a base material $Ba_xSr_{(1-x)}S$ ($0 \leqq x \leqq 1$) are used to produce a composite light emitting strata constituted by the three layers: ZnS:Mn/$Ba_xSr_{(1-x)}S$:Ce/ZnS:Mn.

According to another aspect of the present invention, the light emitting strata can be formed by use of ZnS:Tb,Mn films, which introduce Tb and Mn as impurities for luminescence center into a base material ZnS, and a $Ba_xSr_{(1-x)}S$:Ce film, which introduces Ce as an impurity for luminescence center into a base material $Ba_xSr_{(1-x)}S$ ($0 \leqq x \leqq 1$).

Three thin films of the above-mentioned materials are laminated together to form the light emitting strata constituted by the three layers: ZnS:Tb,Mn/$Ba_xSr_{(1-x)}S$:Ce/ZnS:Tb,Mn.

According to another aspect of the present invention, Zn and $Ba_xSr_{(1-x)}S$:Ce,Eu, which introduces Ce and Eu as impurities for luminescence center into the base material $Ba_xSr_{(1-x)}S$, can be used for thin films of the light emitting strata.

Then, thin films of the above-mentioned materials can be formed into the light emitting strata constituted by the three layers: ZnS/$Ba_xSr_{(1-x)}S$:Ce,Eu/ZnS.

In at least the neighborhood of the interface between each ZnS thin film and the $Ba_xSr_{(1-x)}S$ thin film in the light emitting strata, the crystal orientation of the ZnS thin film is oriented to the zinc blende structure [111] and/or the wurtzite structure [001], and the crystal orientation of the $Ba_xSr_{(1-x)}S$ thin film is oriented to [111] and/or [110].

According to another aspect of the present invention, the thin films constituting the light emitting strata are the three layers: ZnS/$Y_2O_2S$:Ce,Eu/ZnS, which introduce Ce and Eu as impurities for luminescence center into base materials ZnS and $Y_2O_2S$, or the three layers: ZnS/$Y_2O_2S$:Ce,Tb,Eu/ZnS which introduce Ce, Tb and Eu as impurities for luminescence center into base materials ZnS and $Y_2O_2S$.

Then, a color filter is placed on the lower or upper side of the laminated light emitting strata, an electrode of the substrate side and an electrode opposite to the substrate side are patterned to intersect each other perpendicularly, and the color filter is placed on the lower or upper side of the intersecting portion.

Further, three kinds of filters are used for the above-mentioned color filter, each transmitting light of a respective one of the three primary colors, red, green and blue, and being periodically disposed.

The electrically equivalent circuit of the thin-film element has the structure mentioned above so that the electrical characteristics of the thin-film element are equivalent to those of a thin-film element including a single light emitting layer. As a result, the "luminance—voltage" characteristic of the thin-film EL element is equal to that of the thin-film element including the single light emitting layer. Accordingly, the thin-film EL element, in which two or more thin films, having different colors of emitted light, are laminated, can not cause the color of the emitted light to change irrespective of a change in the voltage.

Further, the thin-film EL element, in which a thin film emitting light and a thin film not emitting light are laminated together, can remain chemically stable and emit light of high brightness even on a low voltage.

BEST MODE FOR CARRYING OUT THE INVENTION

The first embodiment of the present invention will be described with reference to FIGS. 1 to 4.

Figure 1:
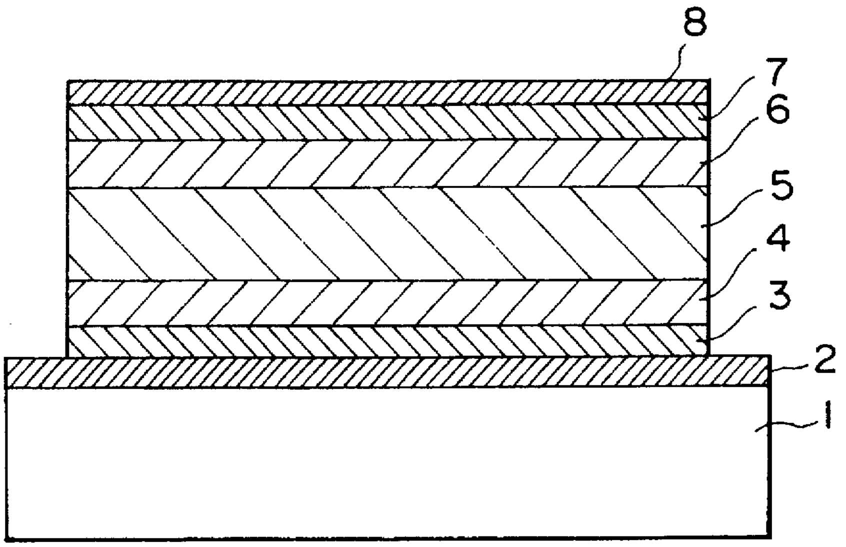
FIG. 1 is a cross-sectional view of a thin-film EL element according to the first embodiment of the present invention.

In this embodiment, a thin-film EL element will be described, in which the light emitting strata is constituted by the three layers: ZnS:Mn/$Ba_{0.1}Sr_{0.9}S$:Ce/ZnS:Mn. FIG. 1 shows an example of this structure which includes a glass substrate 1, a first electrode 2 formed of transparent electrode material, a first insulating layer 3 formed of SION, a first light emitting layer 4 formed of ZnS:Mn, a second light emitting layer 5 formed of $Ba_{0.1}Sr_{0.9}S$:Ce, a third light emitting layer 6 formed of ZnS:Mn, a second insulating layer 7 formed of SION, and a second electrode 8 formed of Al, and which is laminated in due order as shown in the drawing.

Figure 2:
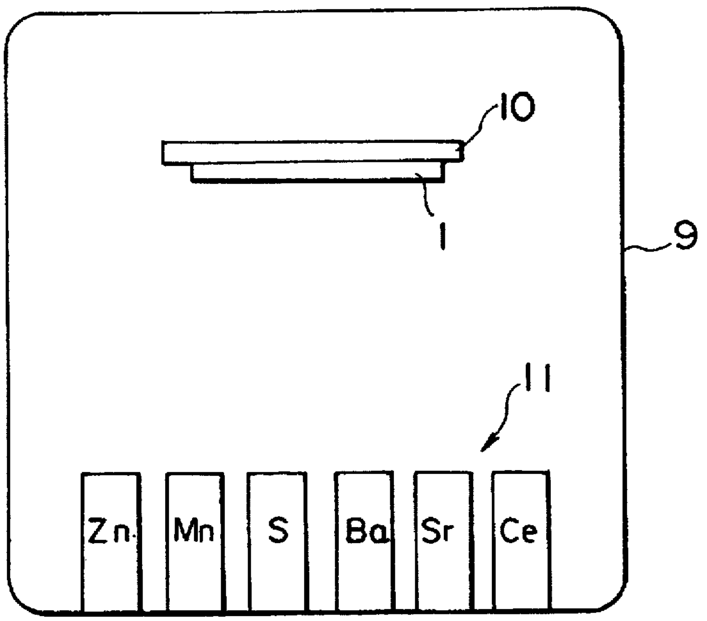
FIG. 2 is a conceptual diagram of an apparatus used for MSD method.

FIG. 2 conceptually shows an MSD apparatus for forming such a laminated structure, in which the glass substrate 1 is held, facing downwardly, by a substrate holder 10 in an upper portion of a vacuum chamber 9, and chemical elements for forming a light emitting layer are separately put in respective vacuum evaporation sources 11 and disposed opposite to each other in the lower portion of the vacuum chamber 9.

The process of forming a thin-film EL element according to the present invention will be described hereinbelow.

At first, an ITC (Indium Tin Oxide) film of 1 μm thickness is formed on the glass substrate 1 as the first electrode 2, by use of a sputtering method; and then a SiON film of 0.15 μm thickness is formed thereon as the first insulating layer 3, similarly by a sputtering method.

The thus processed glass substrate 1 is held by the substrate holder 10 in the vacuum chamber 9 to form the first light emitting layer by use of an MSD method. That is, chemical elements Zn, S and Mn are put in their respective vacuum evaporation sources 11 in the vacuum chamber 9, and the vapors of these elements are independently supplied by individual temperature control onto the first insulating layer 3 on the glass substrate 1 to be chemically bonded thereon, so that the first light emitting layer 4 is formed.

After forming the first light emitting layer 4, the chemical elements Ba, Sr, S and Ce are put in their respective vacuum evaporation sources 11 in the same chamber 9, and the vapors of these elements are independently supplied by individual temperature control onto the first light emitting layer 4 to be chemically bonded thereon, so that the second light emitting layer 5 is formed. Here, the temperature settings of the elements Ba and Sr in the vacuum evaporation sources 11 can be changed so that the concentration x of Ba and the concentration (1−x) of Sr in the $Ba_xSr_{(1-x)}S$:Ce compound can be freely adjusted from 0 to 1.

The third light emitting layer 6 is formed on the second light emitting layer 5 in the same manner as described in the process of the first light emitting layer 4.

Next, after forming the light emitting layers mentioned above, a SiON film of 0.15 μm thickness is formed as the second insulating layer 7 on the upper light emitting layer 6 by the sputtering method, and finally an Al film is formed as the second electrode 8 on the second insulating layer 7 by electron beam evaporation method.

The second and third light emitting layers 5 and 6, formed in a manner as described above are formed by epitaxial growth on the earlier formed light emitting layer 4 or 5, respectively.

Figure 3:
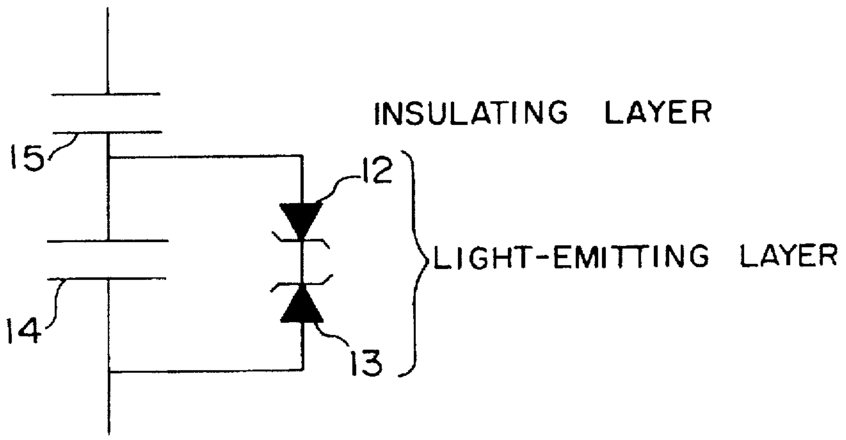
FIG. 3 is a circuit diagram of a circuit electrically equivalent to the thin-film EL element according to the first embodiment.

For-this, electrons can jump between the respective light emitting layers 4, 5 and 6 laminated in due order, so that the electrical characteristics of the light emitting strata are equivalent to those of a circuit shown in FIG. 3 which includes two Zener diodes 12 and 13 connected opposite to each other in series, a capacitor 14 connected in parallel with the serially connected Zener diodes, and a capacitor 15 connected to one end of the capacitor 14.

The structure is equal to a thin-film EL element having a single light emitting layer.

In addition, the epitaxial growth in this case means that, in the growth of a polycrystalline thin film on a polycrystalline thin film, grains constituting the later formed polycrystalline thin film grow by forming the same lattice as that of the base polycrystalline thin film.

Figure 4:
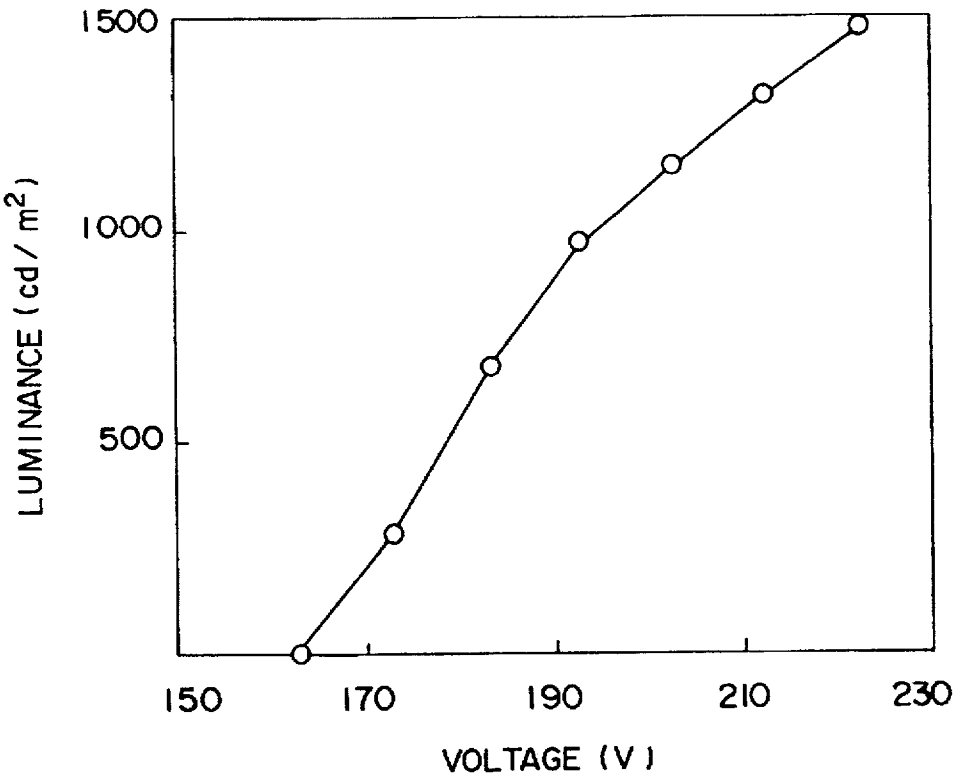
FIG. 4 is a graph showing a luminance—voltage characteristic of the thin-film EL element according to the first embodiment.

FIG. 4 shows a "luminance—voltage" characteristic of the thin-film EL element formed in the above-mentioned embodiment. Here, the luminance of white light emitted from the thin-film EL element increases substantially linearly in accordance with the increase of the voltage. This characteristic corresponds to that of the thin-film EL element having the single light emitting layer and which has a circuit electrically equivalent to that of the single light emitting layer. Accordingly, the thin-film EL element according to this embodiment of the present invention does not permit the color of the emitted light to change, similar to the thin-film EL element including the single light emitting layer, irrespective of a change in the voltage.

On the other hand, the respective light emitting layers 4, 5, and 6 constituting the above-mentioned three layers can be replaced with other strata wherein each of the first light emitting layer 4 and the third light emitting layer 6 is constituted of a ZnS:Tb,Mn thin film which introduces Tb and Mn as impurities for luminescence center into the base material ZnS, and the second light emitting layer 5 laminated between the layers 4 and 6 is constituted of the $Ba_xSr_{(1-x)}S$:Ce ($0 \leqq x \leqq 1$) thin film.

The $Ba_xSr_{(1-x)}S$:Ce, the intermediate layer in the first embodiment, is not as chemically stable as the ZnS:Mn or the ZnS:Tb,Mn layers on either side thereof.

In the light emitting layers 4, 5 and 6, constituting the triple layer strata of the first embodiment, the first and third light emitting layers 4 and 6 are constituted of ZnS:Mn or ZnS:Tb,Mn and can emit light of high brightness in a color range from green to red; while the second light emitting layer 5, constituted of $Ba_xSr_{(1-x)}S$:Ce, for example in the case of x=0, emits light of high brightness in a color range from blue to green.

Here, the three layer light emitting strata according to the first embodiment has the structure in which the second light emitting layer 5, constituted of SrS:Ce and chemically unstable, is sandwiched between the first and third light emitting layers 4 and 6 constituted of ZnS:Mn or ZnS:Tb, Mn and remaining chemically stable, so that the first and third light emitting layers 4 and 6 can serve as a passivation of the second light emitting layer 5, thus, making the overall light emitting strata chemically stable.

Next, a second embodiment of the present invention will be described.

If a thin-film EL element is formed in accordance with the process of forming light emitting strata shown in the first embodiment and the electrically equivalent circuit thereof is equivalent to the circuit of FIG. 3, which includes two Zener diodes 12 and 13 connected opposite to each other in series, a capacitor 14 connected in parallel with the serially connected Zener diodes, and a capacitor 15 connected to one end of the capacitor 14, the thin light emitting strata of the thin-film EL element can constitute the three layers: ZnS/$Ba_xSr_{(1-x)}S$:Ce,Eu/ZnS which introduce Ce and Eu as impurities for luminescence center into base material $Ba_xSr_{(1-x)}S$ ($0 \leqq x \leqq 1$).

Figure 12:
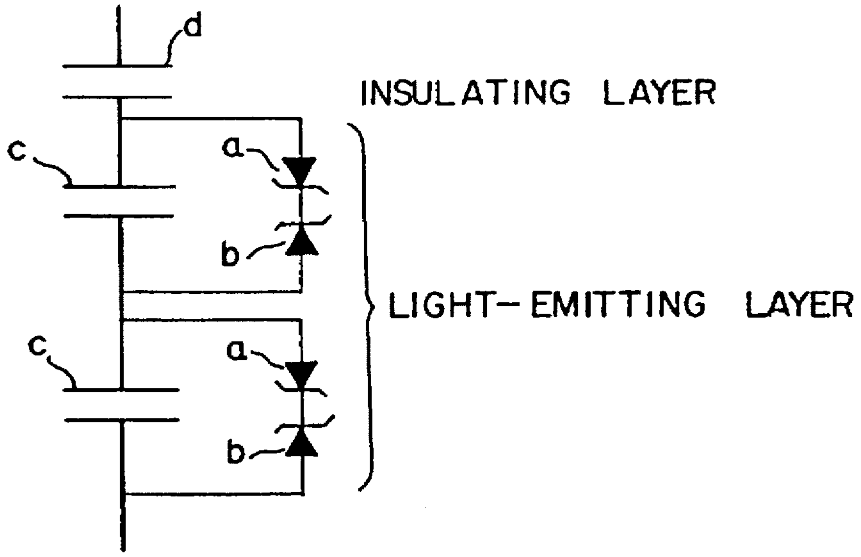
FIG. 12 (PRIOR ART)
FIG. 12 is a circuit diagram of a circuit electrically equivalent to the conventional laminated type thin-film EL element.
Figure 13:
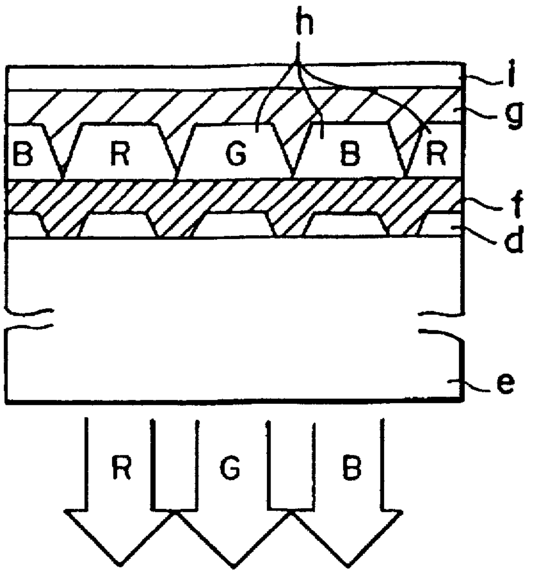
FIG. 13 (PRIOR ART)
FIG. 13 is a cross-sectional view of a first conventional thin-film EL element.
Figure 14:
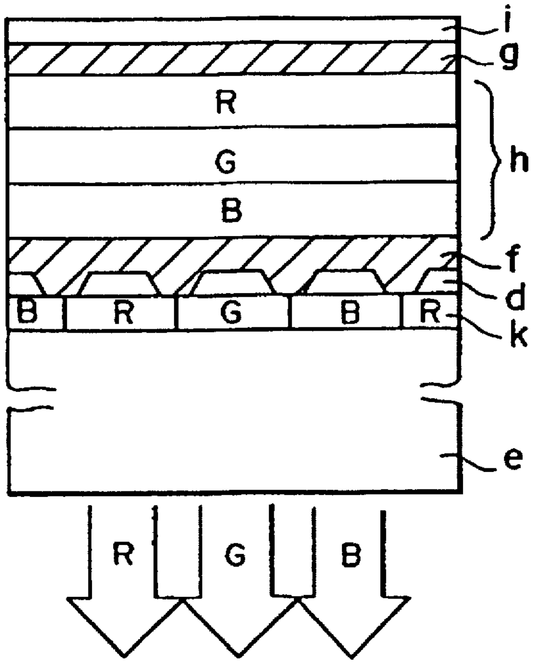
FIG. 14 (PRIOR ART)
FIG. 14 is a cross-sectional view of a second conventional thin-film EL element.

Two kinds of thin-film EL elements are made on an experimental basis to compare the characteristics. The first one is a thin-film EL element which includes a structure in accordance with the second embodiment having the three layers ZnS/$Ba_{0.1}Sr_{0.9}S$:Ce,Eu/ZnS; the second one is a conventional type thin-film EL element B having the electrical characteristics of the element equivalent to those of the conventional circuit, as shown in FIG. 12, which includes two pairs of Zener diodes a and b, each pair being connected opposite to each other in series, two capacitors c connected in series, each being connected in parallel with the serially connected Zener diodes, and a capacitor d connected to one end of the two capacitors c.

The result of comparing and evaluating the characteristics will be described below.

The process of making the trial light emitting strata of the second embodiment is the same as that of the first embodiment, while the trial light emitting strata of the conventional element is formed by the electron beam method. Both of the elements are the same as those of the first embodiment except for the portion of the light emitting strata.

Figure 5:
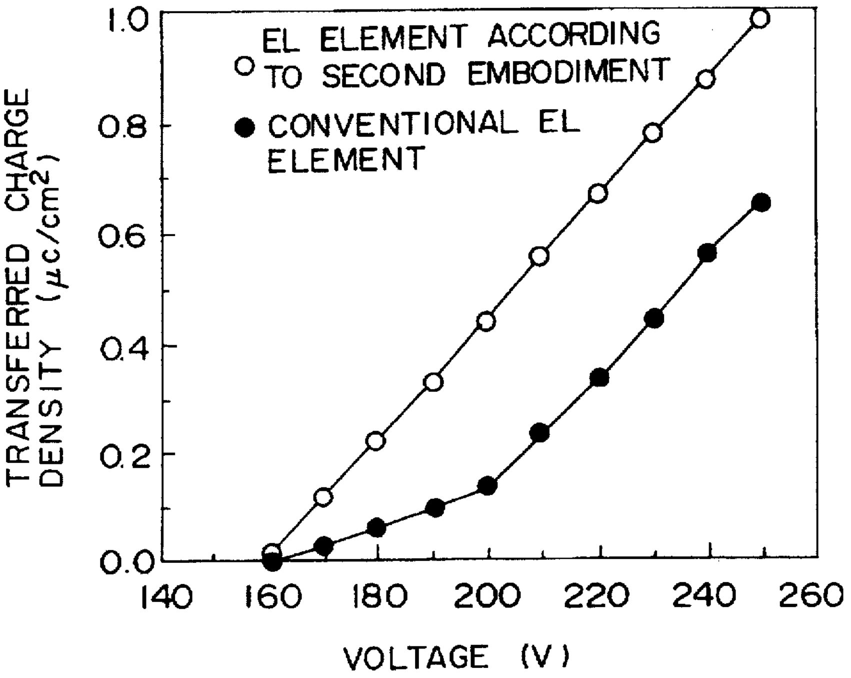
FIG. 5 is a graph showing transferred charge density—voltage characteristics between a conventional thin-film EL element and a thin-film EL element according to the second embodiment of the present invention.

FIG. 5 shows the result of evaluation, in which the voltage dependence of the transferred charge density (dQ) is evaluated as an electrical characteristic. That is, the increase of the dQ value of the element made according to the second embodiment gives an essentially straight line as the voltage increases from 160 V, while the line for the conventional element bends at 200 V. These phenomena correspond to the respective electrical structures, the electrically equivalent circuit of the element made according to the second embodiment being shown in FIG. 3 and the electrically equivalent circuit of the conventional element being shown in FIG. 12.

Figure 6:
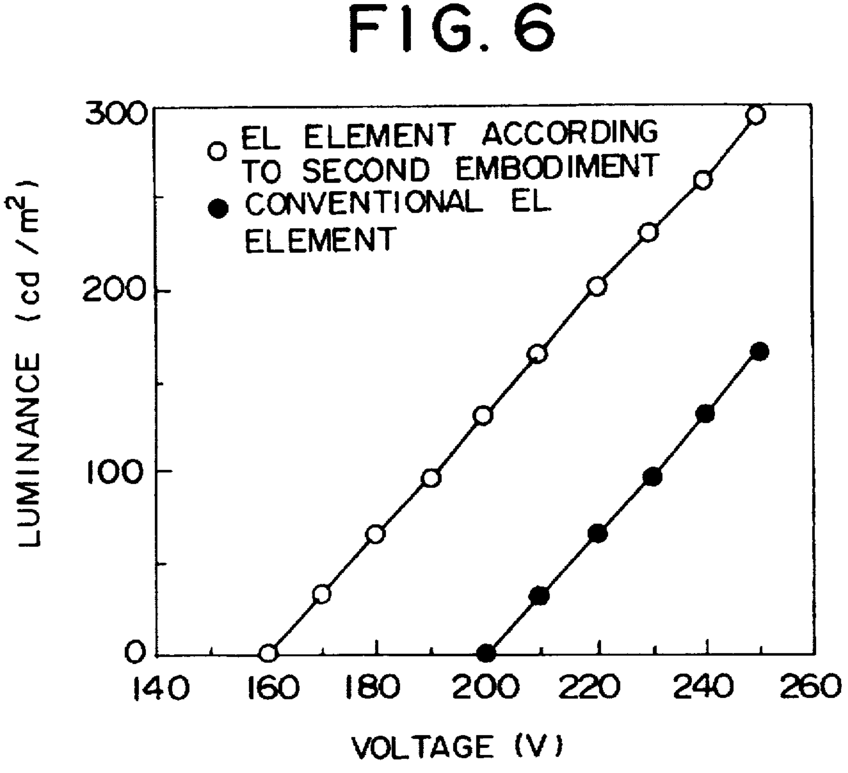
FIG. 6 is a graph showing luminance voltage characteristics between the conventional EL element and the EL element according to the second embodiment.

FIG. 6 shows luminance—voltage characteristics, in which the element made according to the second embodiment starts emitting light at a lower voltage than the conventional element. The luminance increases as the voltage rises, so that the element made according to the second embodiment emits light of higher brightness than that of the conventional element at the same voltage.

Further, a $Y_2O_2S$:Ce,Eu thin film or a $Y_2O_2S$:Ce,Tb,Eu thin film, which introduces Ce and Eu, or Ce, Tb and Eu as impurities for luminescence center into the base material $Y_2O_2S$, can be used as the thin-film of the intermediate layer of the strata ZnS/$Ba_xSr_{(1-x)}$S:Ce,Eu/ZnS to obtain the same evaluation as the case mention above.

Next, the third embodiment of the present invention will be described.

Figure 7:
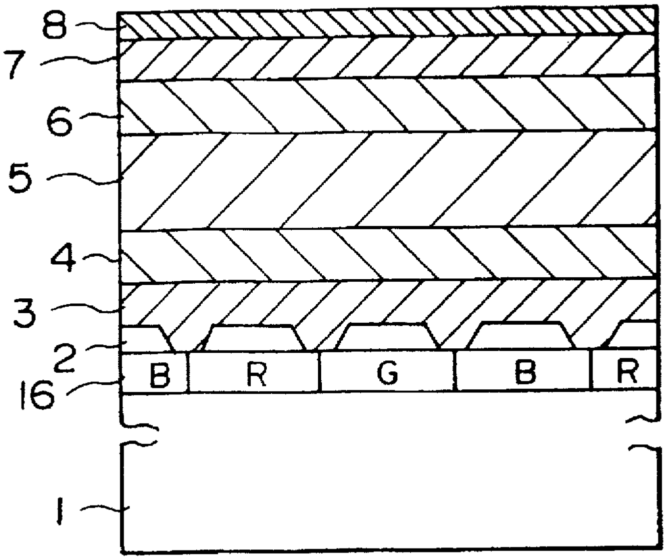
FIG. 7 is a cross-sectional view of a thin-film EL element according to the third embodiment of the present invention.

A structure of an element according to the third embodiment includes a color filter 16 inserted between the glass substrate 1 and the insulating layer 3 as shown in FIG. 7. For the color filter 16, a filter (R), a filter (G) and a filter (B), respectively transmitting light of red (R), green (G) and blue (B), are periodically disposed.

Also, in the thin-film EL element using such a color filter 16, the electrode 2 of the glass substrate 1 side and the electrode 8 opposite to the substrate side are patterned to intersect each other perpendicularly, so that the color filter 16 can be placed on the lower or upper side of the intersecting portion.

Figure 8:
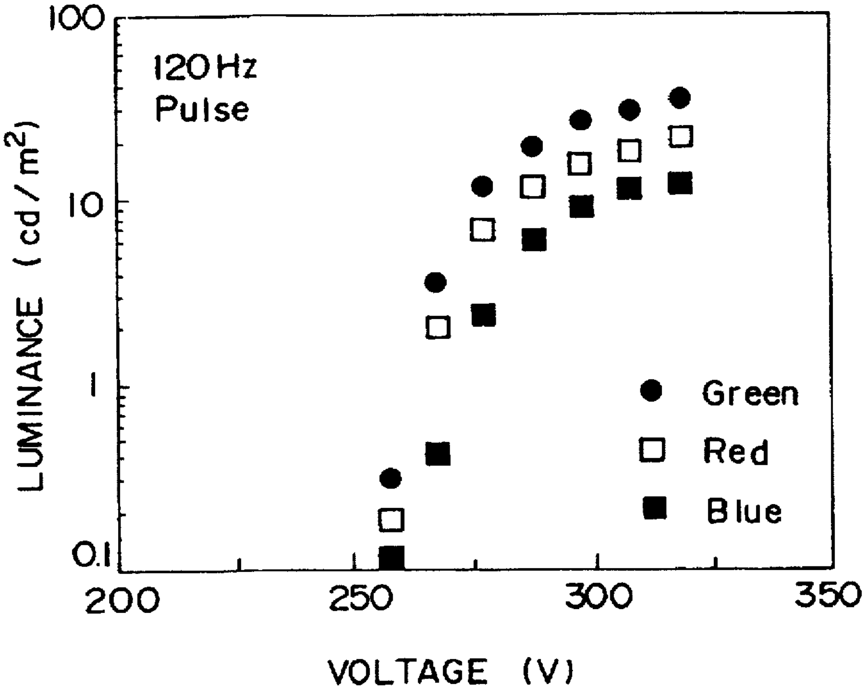
FIG. 8 is a graph showing a luminance voltage characteristic of the thin-film EL element according to the third embodiment.
Figure 9:
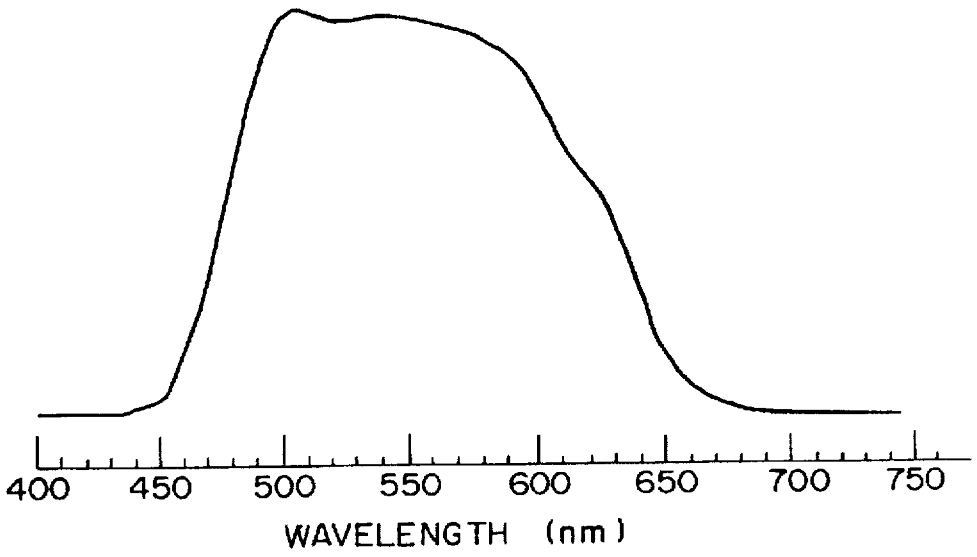
FIG. 9 is a graph showing an emission spectrum of the thin-film EL element obtained from the third embodiment.

FIG. 8 shows a luminance—voltage characteristic of the element according to the third embodiment, and FIG. 9 shows an emission spectrum previous to transmitting light through the color filter 16. From FIGS. 8 and 9, the element of the third embodiment can emit light of highly bright red (R), green (G) and blue (B) by dividing the wide emission spectrum with the color filter 16.

Next, the fourth embodiment of the present invention will be described.

As thin films constituting a light emitting strata of the fourth embodiment, three kinds of thin-film EL elements are made on an experimental basis by separately combining three kinds of $Ba_xSr_{(1-x)}$S:Ce thin films, having the respective crystal orientations of [100], [110], and [111], with the ZnS:Mn thin films, having the crystal orientation of wurtzite structure [001]. An example of comparing the characteristics will be described below.

The ZnS:Mn thin film, oriented to the wurtzite structure [001], is obtained by use of the MSD method for forming the film in a predetermined condition.

Also, the crystal orientation of the $Ba_xSr_{(1-x)}$S:Ce thin film can be controlled by changing the ratio of the supply amount of Ba and Sr to S (Ba,Sr/S) with the same MSD method (see "S. TANDA, A. MIYAKOSHI and T. NIRE: Conference Record of the 1988 International Display Research Conference, P. 122").

The structure of the element according to the fourth embodiment is the same as that of the first embodiment and the forming method is also the same except for the film forming conditions of the light emitting strata.

Figure 10:
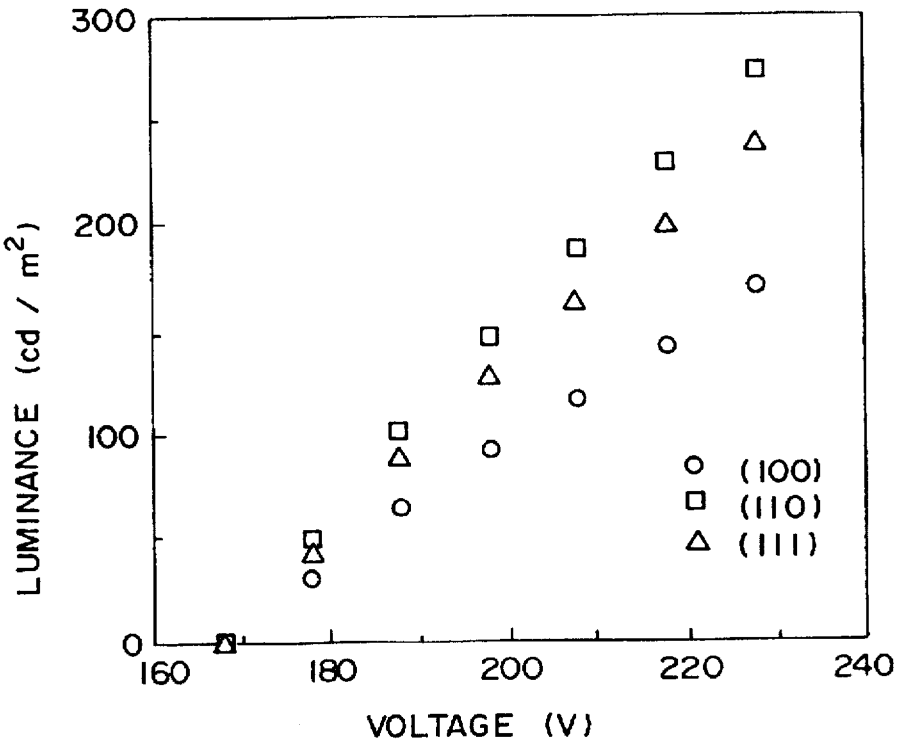
FIG. 10 is a graph showing luminance—voltage characteristics of thin-film EL elements according to the fourth embodiment.
Figure 11:
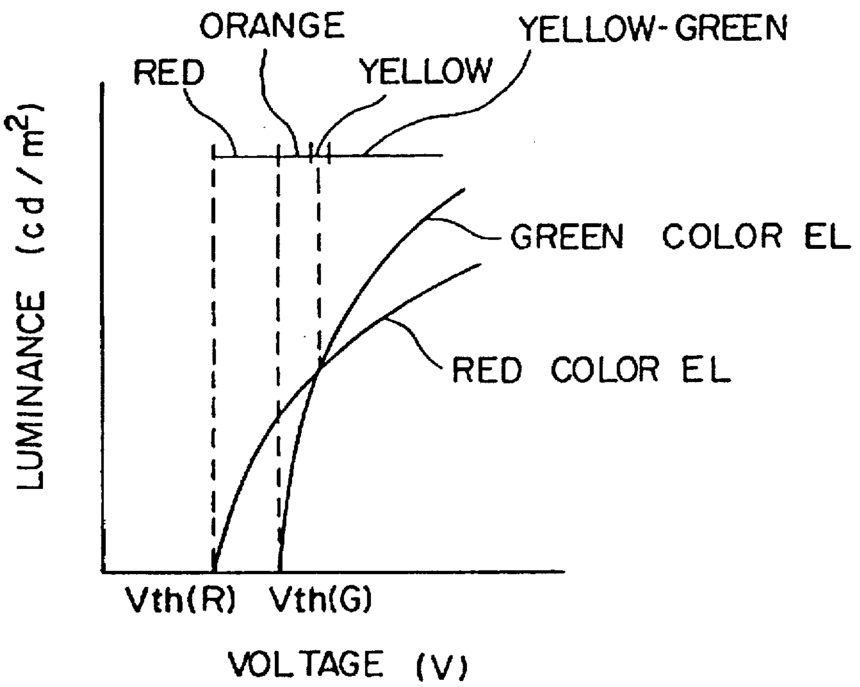
FIG. 11 (PRIOR ART)
FIG. 11 is a graph showing a luminance—voltage characteristic of a conventional laminated type thin film EL element.

FIG. 10 shows luminance—voltage characteristics of thin-film EL elements which use the $Ba_xSr_{(1-x)}$S:Ce thin films having the respective crystal orientations of [100], [110] and [111], and which respectively include structures of [100], [110] and [111]. Although all of these elements [100], [110] and [111] do not permit the color of the emitted light to change irrespective of a change in the voltage, the luminances of [111] and [110] are higher than that of [100]. That is because the lattice coordination of the crystal orientation of the ZnS thin film is high with respect to the side of zinc blende structure [111] or the wurtzite structure [001] and the lattice coordination of the $Ba_xSr_{(1-x)}$S thin film is high with respect to the side of [111] or [110], i.e., a gap of bond distance between lattices is small so that the crystal distortion and the lattice defect can be reduced, thereby obtaining a thin-film EL element enabling emission of light of higher brightness.

INDUSTRIAL APPLICABILITY

The present invention can be effectively used for a thin-film EL element which does not permit the color of the emitted light to change irrespective of a change in the voltage, which emits light of high brightness even on a low voltage, and which remains chemically stable. Also, the present invention can provide a thin-film EL display capable of full color display by combining a filter therein.

What is claimed is:

1. An EL element which comprises:

at least two polycrystalline light emitting layers, each of said at least two polycrystalline light emitting layers comprising a base material, said at least two polycrystalline light emitting layers being positioned together so as to form at least one adjacent pair of polycrystalline light emitting layers, each adjacent pair having an interface between the polycrystalline light emitting layers of that adjacent pair, the base material of a first polycrystalline light emitting layer in an adjacent pair being different from the base material of a second polycrystalline light emitting layer in that adjacent pair, said first polycrystalline light emitting layer being capable of emitting light of a color which is different from a color of light emitted by said second polycrystalline light emitting layer, all of said polycrystalline light emitting layers being laminated together to form a composite light emitting strata, wherein said composite light emitting strata has first and second sides with each of said first and second sides being a surface of a respective one of said at least two polycrystalline light emitting layers, and a first insulating layer, said first insulating layer being laminated to said first side of said composite light emitting strata, wherein each interface between a light emitting layer and another light emitting layer laminated thereto in said composite light emitting strata is formed by epitaxial growth, whereby a color of light emitted by said composite light emitting strata does not change with a change in voltage applied across said composite light emitting strata.

2. In EL element in accordance with claim 1, wherein the electrical characteristics of said EL element are equivalent to those of a single circuit consisting of two Zener diodes connected opposite each other in series, a first capacitor connected in parallel with the serially connected Zener diodes, and a second capacitor connected to one end of said first capacitor.

3. An EL element in accordance with claim 1, wherein each of the light emitting layers is formed by a Multi-Source Deposition method or a Chemical Vapor Deposition method.

4. An EL element in accordance with claim 1, wherein at least one of said light emitting layers is a ZnS film, and wherein at least one of said light emitting layers is a $Y_2O_2S$:Ce,Eu film wherein Ce and Eu are impurities for luminescence center in base material $Y_2O_2S$.

5. An EL element in accordance with claim 4, wherein said composite light emitting strata comprises a three layer structure ZnS/$Y_2O_2S$:Ce,Eu/ZnS.

6. An EL element in accordance with claim 1, wherein at least one of said light emitting layers is a ZnS film, and wherein at least one of said light emitting layers is a $Y_2O_2S$:Ce,Tb,Eu film wherein Ce, Tb, and Eu are impurities for luminescence center in base material $Y_2O_2S$.

7. An EL element in accordance with claim 6, wherein said composite light emitting strata comprises a three layer structure ZnS/$Y_2O_2S$:Ce,Tb,Eu/ZnS.

8. An EL element in accordance with claim 1, further comprising a color filter.

9. An EL element in accordance with claim 8, further comprising a second insulating layer laminated to said second side of said composite light emitting strata, and first and second electrodes, each of said first and second electrodes being positioned in contact with a surface of a respective one of said first and second insulating layers which surface is remote from said composite light emitting strata, and wherein said color filter is positioned on an electrode surface of one of said first and second electrodes which electrode surface is remote from said composite light emitting strata.

10. An EL element in accordance with claim 7, wherein said color filter comprises periodically disposed segments, each segment transmitting light of a respective one of the three primary colors, red, green and blue.

11. An EL element in accordance with claim 1, wherein at least one of said light emitting layers is a ZnS:Mn film wherein Mn is an impurity for luminescence center in base material ZnS, and wherein at least one of said light emitting layers is a $Ba_xSr_{(1-x)}S$:Ce film wherein Ce is an impurity for luminescence center in base material $Ba_xSr_{(1-x)}S$ ($0 \leqq x \leqq 1$).

12. An EL element in accordance with claim 11, wherein said composite light emitting strata comprises a three layer structure ZnS:Mn/$Ba_xSr_{(1-x)}S$:Ce/ZnS:Mn.

13. An EL element in accordance with claim 12, wherein a crystal orientation of each ZnS:Mn film is oriented to at least one of the zinc blende structure [111] and the wurtzite structure [001], and wherein a crystal orientation of said $Ba_xSr_{(1-x)}S$:Ce film is oriented to at least one of [111] and [110] at each interface between a ZnS:Mn film and said $Ba_xSr_{(1-x)}S$:Ce film.

14. An EL element in accordance with claim 1, wherein at least one of said light emitting layers is a ZnS:Tb,Mn film wherein Tb and Mn are impurities for luminescence center in base material ZnS, and wherein at least one of said light emitting layers is a $Ba_xSr_{(1-x)}S$:Ce film wherein Ce is an impurity for luminescence center in base material $Ba_xSr_{(1-x)}S$ ($0 \leqq x \leqq 1$).

15. An EL element in accordance with claim 14, wherein said composite light emitting strata comprises a three layer structure ZnS:Tb,Mn/$Ba_xSr_{(1-x)}S$:Ce/ZnS:Tb,Mn.

16. An EL element in accordance with claim 15, wherein a crystal orientation of each ZnS:Tb,Mn film is oriented to at least one of the zinc blende structure [111] and the wurtzite structure [001], and wherein a crystal orientation of said $Ba_xSr_{(1-x)}S$:Ce film is oriented to at least one of [111] and [110] at each interface between a ZnS:Tb,Mn film and said $Ba_xSr_{(1-x)}S$:Ce film.

17. An EL element in accordance with claim 1, wherein said composite light emitting strata comprises at least three polycrystalline light emitting layers laminated together, with an intermediate one of the three polycrystalline light emitting layers being a $Ba_xSr_{(1-x)}S$:Ce ($0 \leqq x \leqq 1$) film, and with each one of the light emitting layers laminated to said intermediate one being a film comprising ZnS.

18. An EL element in accordance with claim 17, wherein a crystal orientation of each ZnS film is oriented to at least one of the zinc blende structure [111] and the wurtzite structure [001], and wherein a crystal orientation of said $Ba_xSr_{(1-x)}S$:Ce ($0 \leqq x \leqq 1$) film is oriented to at least one of [111] and [110] at each interface between a ZnS film and said $Ba_xSr_{(1-x)}S$:Ce ($0 \leqq x \leqq 1$) film.

19. An EL element in accordance with claim 1, wherein said composite light emitting strata comprises a three layer structure ZnS/$Ba_xSr_{(1-x)}S$:Ce,Eu/ZnS ($0 \leqq x \leqq 1$).

20. An EL element in accordance with claim 19, wherein a crystal orientation of each ZnS film in said three layer structure is oriented to at least one of the zinc blende structure [111] and the wurtzite structure [001], and wherein a crystal orientation of the $Ba_xSr_{(1-x)}S$:Ce,Eu ($0 \leqq x \leqq 1$) film in said three layer structure is oriented to at least one of [111] and [110] at each interface between a ZnS film and said $Ba_xSr_{(1-x)}S$:Ce,Eu ($0 \leqq x \leqq 1$) film.

* * * * *

UNITED STATES PATENT AND TRADEMARK OFFICE

CERTIFICATE OF CORRECTION

PATENT NO. : 5,641,582

DATED : June 24, 1997

INVENTOR(S) : Nire et al

It is certified that error appears in the above-indentified patent and that said Letters Patent is hereby corrected as shown below:

Column 9, line 48,
delete "claim 7," and insert "claim 9,".

Signed and Sealed this

Twenty-third Day of September, 1997

Attest:

BRUCE LEHMAN

*Attesting Officer* *Commissioner of Patents and Trademarks*